J. H. IGO.
BUMPER FOR AUTOMOBILES.
APPLICATION FILED MAR. 10, 1920.
1,410,015.
Patented Mar. 21, 1922.
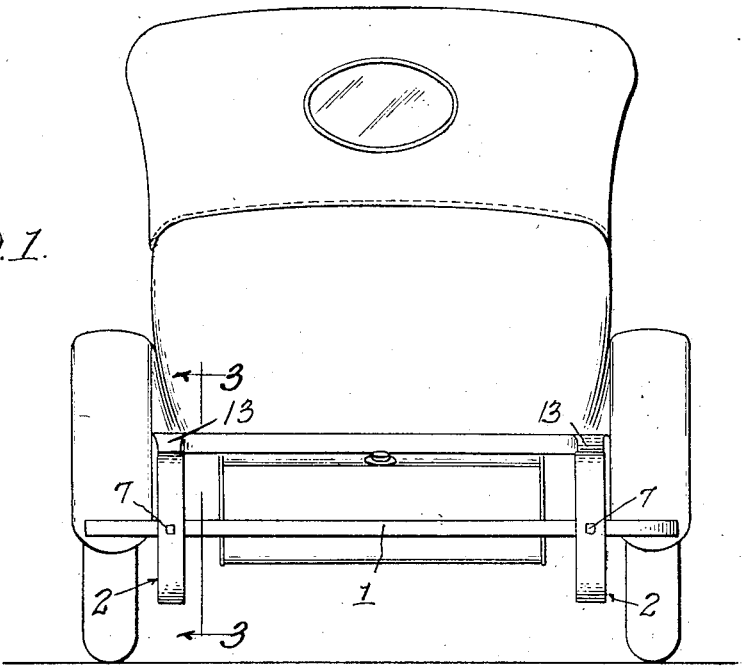
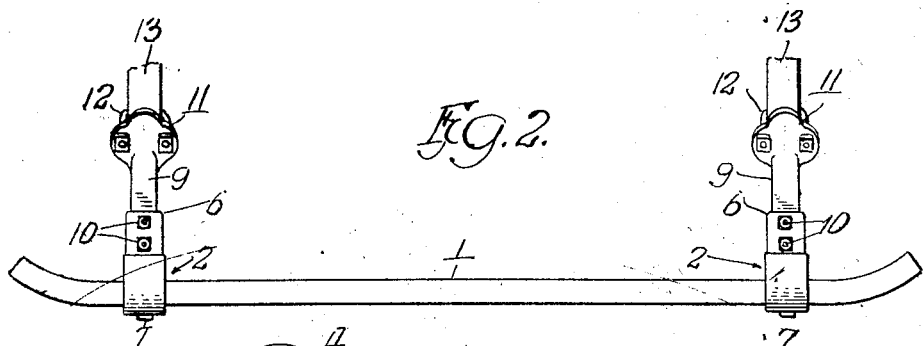
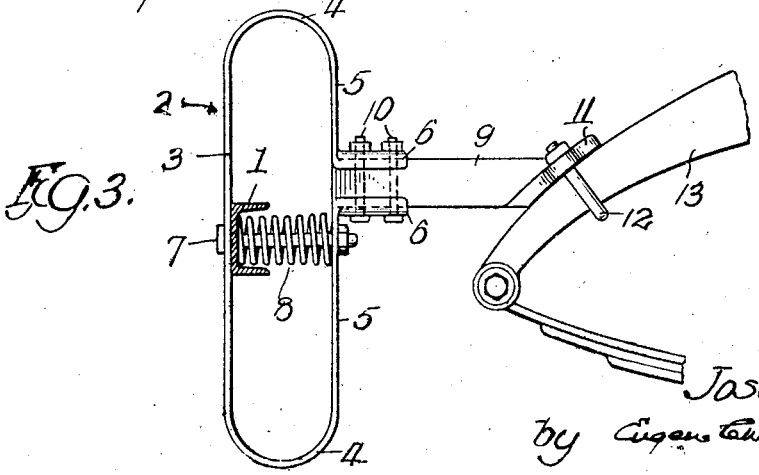
Inventor
Joseph H. Igo

UNITED STATES PATENT OFFICE.

JOSEPH H. IGO, OF CHICAGO HEIGHTS, ILLINOIS.

BUMPER FOR AUTOMOBILES.

1,410,015.  Specification of Letters Patent.  Patented Mar. 21, 1922.

Application filed March 10, 1920. Serial No. 364,721.

*To all whom it may concern:*

Be it known that I, JOSEPH H. IGO, a citizen of the United States, residing at Chicago Heights, in the county of Cook and State of Illinois, have invented new and useful Improvements in Bumpers for Automobiles, of which the following is a specification.

This invention relates to bumpers for automobiles.

Automobiles are usually provided with substantially straight bumper bars, some at the front, others at the rear, and still others at both ends of the car. These bars on different cars are not always the same height above the roadway, with the result that the bars on cars, when colliding end to end, pass each other, either under or above as the case may be, and injure or damage the parts of the car which the bumper bars are designed to protct. In the case of cars which have their bumper bars substantially the same height above the roadway, or have their bars slightly above or below the bars on cars with which they collide, the bars spring past each other and become interlocked and thus block the traffic until the trouble is overcome, as by jacking up of one car to free its bumper bar from the other.

The object of my invention is to provide a bumper device which will avoid these difficulties, and such device comprises, in the main, a substantially straight bumper bar, to which are secured two resilient spring members, one adjacent each end of said bar and vertically arranged to have portions extending above and below the bar so as to be in position to receive the impact of the bumper bar on the automobile collided with, whether the bumper bar on that car is above or below or in substantially the same plane as the bar on the car equipped with my device, and thus prevent the bars from passing each other and doing injury or damage to the parts of the cars to the rear of the bars, and also prevent the bars from becoming interlocked.

The invention consists further in the matters hereinafter described and more particularly pointed out in the appended claims.

In the accompanying drawings—

Fig. 1 is a view of the rear end of an automobile and showing applied thereto, a bumper device constructed in accordance with my invention;

Fig. 2 is a top plan view of the bumper device; and

Fig. 3 is an enlarged vertical sectional view taken on line 3—3 of Fig. 1.

The bumper device, of my invention, comprises a substantially straight bumper bar 1, horizontally arranged and extending across that end of the car to which it is applied. For said bar, there are two resilient spring members 2, 2, both substantially alike and each made from a strip of spring metal, preferably flat, and bent to have the shape shown in Fig. 3, thereby providing each spring member with a straight front section 3, curved end sections 4, and straight rear sections 5, which have their ends bent outward to provide fastening flanges 6. Each spring member 2 is applied to the bumper bar 1 to extend across the same, that is, above and below the bar, this being effected by having the front section 3 extend across the bar on the outside thereof and secured thereto by a bolt 7. The bolt extends through the bar 1, across the spring member 2, and loosely through the rear section 5, and there receives on its threaded end a clamp nut as shown. About the bolt is a coil spring 8, one end bearing against the inside of the bar 1 and the other end against the rear section 5. This spring 8 together with the spring property of the spring member 2 serves to hold apart the front and rear sections of the spring member, and also holds the bar 1 spaced outward from the rear section of said spring member. Thus when the bar 1, or the spring members 2, or both, receive an impact, by reason of contact with an object, the parts will yield and absorb the shock.

The fastening flanges 6 of each spring member receive between them the outer end of a bracket arm 9 and are secured thereto by bolts 10. The inner end of the bracket arm is provided with a flange 11, to be engaged by one or more U-bolts 12 for securing the arm to one of the side members 13 of the automobile frame or chassis, or other fixed part of the car. This construction secures the bumper device to the car at the end desired and holds the parts spaced outward therefrom.

The spring members 2 extending above and below the bar 1 are thus in position to receive the impact of the bumper bar or equivalent part on the car with which the collision takes place, whether that bar is above or below the bar 1 or in substantially the same plane therewith. These spring members prevent the bumper bars on the colliding cars from passing each other and doing injury or damage to the parts of the cars behind the bars, and also prevent the bars from interlocking with each other. Thus with my device there is no danger of the cars being damaged or injured or the bumper bars becoming interlocked, especially when driving at a slow speed and with frequent stops on a crowded roadway or boulevard. Furthermore, when applied to the rear end of a car, my device protects that end of the car from being injured or damaged, in case of a collision when parked or standing still along a curb or in a garage or elsewhere. The spring members 2 being resilient yield under impact with any object, and thus protect the car from injury by the force of the impact. This is aided by the coil spring 8, which serves further to take up these shocks. The bar 1, in being secured to both spring members 2, serves to tie them together and prevents distortion of them out of their proper positions by impact with an object.

While I have shown herein the bumper device of my invention as being applied to the rear end of an automobile, it is to be of course understood that the device could equally as well be applied to the front of the car and, in fact, to both ends, for when applied to the front it would prevent the front bumper bar from passing over or under the bumper bar at the rear end of a car ahead and thus prevent interlocking of those bars in case of a collision, and when applied at the rear of the car, would prevent the same difficulties at that end.

I claim as my invention:

1. A bumper device for automobiles, comprising a substantially straight horizontal bumper bar adapted to extend across an end of the automobile, two resilient members, one adjacent each end of said bar, and extending vertically above and below the same, each member having substantially parallel front and rear sections connected together above and below the bar, and being arranged with the front section extending across the bar on the outside thereof and secured thereto, and the rear section behind said bar, and means for securing the rear sections of said resilient members to the automobile.

2. A bumper device for automobiles, comprising a substantially straight horizontal bumper bar adapted to extend across an end of the automobile, two resilient members, one adjacent each end of said bar and extending vertically above and below the same, each member being formed from a strip of spring metal bent to have substantially parallel front and rear sections connected together above and below the bar by curved end sections, and arranged with the front section extending across the bar on the outside thereof and secured thereto, and the rear section behind said bar, and a bracket arm secured to the rear section of each spring member for attaching the bumper device to the automobile.

3. A bumper device for automobiles, comprising a substantially straight horizontal bumper bar adapted to extend across an end of the automobile, a plurality of resilient members secured to said bar and extending vertically above and below the same, each member having substantially parallel front and rear sections connected together above and below said bar, a coil spring interposed between the front and rear sections of each of said members and in the same plane as said bar, and means for securing the bumper device to the automobile.

4. A bumper device for automobiles, comprising a substantially straight horizontal bumper bar adapted to extend across an end of the automobile, two resilient members, one adjacent each end of said bar and extending vertically above and below the same, each member being formed from a strip of spring metal bent to have substantially parallel front and rear sections connected together above and below the bar by curved end sections, and arranged with the front section extending across the bar on the outside thereof and the rear section behind said bar, a bolt extending through the bar and the front and rear sections of each resilient member, a coil spring about each bolt and bearing against the bar and the rear section of the resilient member, and a bracket arm secured to the rear section of each resilient member for attaching the bumper device to the automobile.

In testimony that I claim the foregoing as my invention, I affix my signature, this 8th day of March, A. D. 1920.

JOSEPH H. IGO